US012756271B2

(12) United States Patent
Itaya et al.

(10) Patent No.: US 12,756,271 B2
(45) Date of Patent: Oct. 6, 2026

(54) ELECTRIC MOTOR SYSTEM

(71) Applicant: Hitachi Astemo, Ltd., Hitachinaka (JP)

(72) Inventors: Takaki Itaya, Hitachinaka (JP); Noriyuki Maekawa, Hitachinaka (JP); Shigehisa Aoyagi, Hitachinaka (JP); Hideaki Goto, Hitachinaka (JP); Shogo Miyamoto, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 186 days.

(21) Appl. No.: 18/565,440

(22) PCT Filed: Feb. 9, 2022

(86) PCT No.: PCT/JP2022/005163
§ 371 (c)(1),
(2) Date: Nov. 29, 2023

(87) PCT Pub. No.: WO2023/032257
PCT Pub. Date: Mar. 9, 2023

(65) Prior Publication Data

US 2024/0266920 A1 Aug. 8, 2024

(30) Foreign Application Priority Data

Aug. 31, 2021 (JP) ................................ 2021-140864

(51) Int. Cl.
*H02K 9/19* (2006.01)
*H02K 7/116* (2006.01)

(52) U.S. Cl.
CPC ............... *H02K 9/19* (2013.01); *H02K 7/116* (2013.01)

(58) Field of Classification Search
CPC .. H02K 9/00; H02K 9/19; H02K 7/00; H02K 7/10; H02K 7/116
See application file for complete search history.

(56) References Cited

U.S. PATENT DOCUMENTS 2,911,549 A * 11/1959 Culk ...................... H02K 5/128 310/90
2009/0277416 A1 11/2009 Saito
2019/0178365 A1* 6/2019 Ishikawa ............ F16H 57/0493

FOREIGN PATENT DOCUMENTS

JP 2001-258516 A 9/2001
JP 2002-293812 A 10/2002
(Continued)

OTHER PUBLICATIONS

Machine Translation of JP 2008267163 A (Year: 2008).*
(Continued)

*Primary Examiner* — Alexander A Singh
*Assistant Examiner* — Charlie Frank Mann, Jr.
(74) *Attorney, Agent, or Firm* — Foley & Lardner LLP

(57) ABSTRACT

An object of the present invention is to provide an electric motor system capable of suppressing deterioration in cooling performance due to mixing of bubbles (air) into a refrigerant. An electric motor system 100 of the present invention includes: a gear 134; a first surface 155 that receives oil scraped off as the gear 134 rotates; a second surface 153 that is located downward in a vertical direction with respect to the first surface 155, faces the first surface 155 at a position overlapping the first surface 155 in the vertical direction, receives the oil dropped from the first surface 155, and receives the oil scraped up as the gear 134 rotates; and a recess 151 located downward in the vertical direction with respect to the second surface 153 and into which the oil received by the second surface 153 flows. Both ends of the second surface 153 in a horizontal direction perpendicular to the vertical direction and perpendicular to an axial center of the gear 134 are located inside both ends of the recess 151 in the horizontal direction.

7 Claims, 5 Drawing Sheets

(56) References Cited

FOREIGN PATENT DOCUMENTS

| | | | | |
|---|---|---|---|---|
| JP | 2005047096 | A | * | 2/2005 |
| JP | 2008267163 | A | * | 11/2008 |
| JP | 2009270545 | A | * | 11/2009 |
| WO | WO-2018/030372 | A1 | | 2/2018 |

OTHER PUBLICATIONS

Machine Translation of JP 2009270545 A (Year: 2009).*
Machine Translation of JP 2005047096 A (Year: 2005).*
International Search Report with English Translation of International Patent Application No. PCT/JP2022/005163 dated Mar. 15, 2022 (5 pages).

* cited by examiner

ELECTRIC MOTOR SYSTEM

TECHNICAL FIELD

The present invention relates to an electric motor system (e-Axle) including an electric motor, an inverter, and a speed reducer used as a power source of an electric automobile, an electric motor, a hybrid car using an internal combustion engine as a power source, or the like.

BACKGROUND ART

As a background art of the present technical field, a motor unit described in WO 2018/030372 A (Patent Literature 1) is known. Patent Literature 1 describes a motor unit including a motor having a rotor, a speed reduction device having an intermediate gear that rotates about an intermediate shaft, a differential device having a ring gear that rotates about a differential shaft, a housing, oil stored in a vertically lower region of a housing space, and an oil passage that supplies the oil to the motor, in which at least a part of the ring gear is located below a liquid surface of the oil stored in the vertically lower region of the housing space (see Abstract).

In the motor unit of Patent Literature 1, the housing space in which the motor, the speed reduction device, and the differential device are housed is provided inside the housing, and an oil reservoir in which the oil is accumulated is provided in a lower region of the housing space (paragraphs 0017 to 0018). A part of the differential device is immersed in the oil reservoir, the oil accumulated in the oil reservoir is scraped up by the operation of the differential device, and a part thereof is supplied to a first oil passage (paragraph 0019). In the path of the first oil passage, a first reservoir for receiving the oil scraped up by the differential device is provided (paragraphs 0024 and 0107). On the upper side of the first reservoir, a plate-like eaves portion provided on a gear chamber ceiling portion and extending along the axial direction is disposed (paragraph 0115). A part of the oil scraped up and scattered by the ring gear of the differential device hits the eaves portion and flows along the surface of the eaves portion, becomes a large droplet at the lower end of the eaves portion, and falls downward and accumulates in the first reservoir (paragraph 0115).

CITATION LIST

Patent Literature

PTL 1: WO 2018/030372 A

SUMMARY OF INVENTION

Technical Problem

In the motor unit of Patent Literature 1, the oil that flows along the surface of the eaves portion, becomes a large droplet at the lower end of the eaves portion, and falls into the first reservoir may collide with the liquid surface of the oil accumulated in the first reservoir to generate air bubbles, and the air bubbles may be mixed in the oil accumulated in the first reservoir.

Hereinafter, the refrigerant is not limited to the oil but is referred to as a refrigerant. When bubbles (air) are mixed in the refrigerant, heat transfer in the refrigerant or heat transfer between the refrigerant and a device requiring cooling is hindered, and cooling performance is deteriorated. Patent Literature 1 does not consider such deterioration in cooling performance.

An object of the present invention is to provide an electric motor system capable of suppressing deterioration in cooling performance due to mixing of bubbles (air) into a refrigerant.

Solution to Problem

In order to achieve the above object, an electric motor system of the present invention includes: a gear; a first surface that receives oil scraped off as the gear rotates; a second surface that is located downward in a vertical direction with respect to the first surface, faces the first surface at a position overlapping the first surface in the vertical direction, receives the oil dropped from the first surface, and receives the oil scraped up as the gear rotates; and a recess located downward in the vertical direction with respect to the second surface and into which the oil received by the second surface flows, in which both ends of the second surface in a horizontal direction perpendicular to the vertical direction and perpendicular to an axial center of the gear are located inside both ends of the recess in the horizontal direction.

In order to achieve the above object, an electric motor system of the present invention includes: a gear; a first surface that receives oil scraped off as the gear rotates; a second surface that is located downward in a vertical direction with respect to the first surface, faces the first surface at a position overlapping the first surface in the vertical direction, receives the oil dropped from the first surface, and receives the oil scraped up as the gear rotates; and a recess located downward in the vertical direction with respect to the second surface and into which the oil collected on the second surface flows, in which the first surface is inclined such that a side closer to the gear is located upward in the vertical direction and a side farther from the gear is located downward in the vertical direction in a horizontal direction perpendicular to the vertical direction and perpendicular to an axial center of the gear, in which the second surface is inclined such that an end closer to the gear is located upward in the vertical direction with respect to an end farther from the gear in the horizontal direction, and in which a flow path communicating with an inside of the recess is formed on a side of the end farther from the gear.

Advantageous Effects of Invention

According to the present invention, it is possible to provide an electric motor system capable of suppressing deterioration in cooling performance due to mixing of bubbles (air) into a refrigerant.

Problems, configurations, and effects other than those described above will be clarified by the following description of embodiment.

DESCRIPTION OF EMBODIMENT

Hereinafter, an embodiment of an electric motor system (electric drive device) according to the present invention will be described with reference to the drawings. The electric motor system of the present embodiment is used as an e-Axle including an electric motor, an inverter, and a speed reduction device (speed reducer) as a drive unit of an automobile using the electric motor as at least a part of a drive source, such as an electric automobile or a hybrid automobile.

Figure 1:
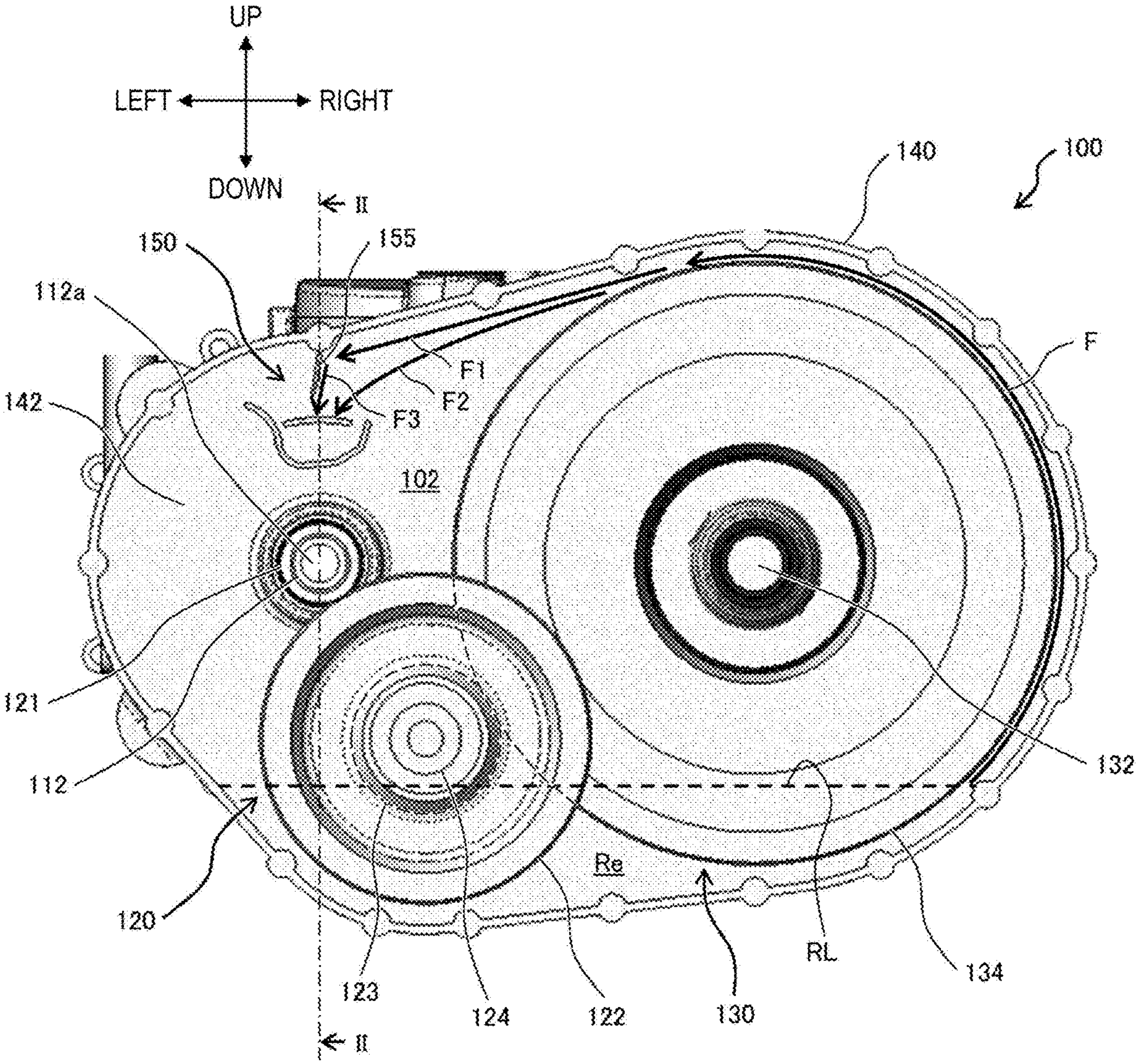
FIG. 1 is a plan view illustrating a configuration of a housing portion (gear housing space) of a speed reduction device and a differential device in an electric motor system according to an embodiment of the present invention.

FIG. 1 is a plan view illustrating a configuration of a housing portion (gear housing space) 102 of a speed reduction device 120 and a differential device 130 of an electric motor system 100 according to an embodiment of the present invention.

The up-down direction and the left-right direction are defined based on FIG. 1. The up-down direction is a vertical direction, and the left-right direction coincides with the horizontal direction. The up-down direction and the left-right direction do not need to completely coincide with the direction illustrated in FIG. 1, and may be slightly inclined with respect to the direction illustrated in FIG. 1. Further, a direction along an axial center of an output shaft 110*a* of the electric motor 110 will be referred to as an axial direction.

The electric motor system 100 includes an electric motor 110 (see FIG. 2), a speed reduction device 120, and a differential device 130, and the electric motor 110 (see FIG. 2), the speed reduction device 120, and the differential device 130 are housed inside a gear chamber (gear housing portion) 102 of the housing 140.

In FIG. 1, a broken line RL represents height of a liquid surface of a refrigerant Re filled in the housing 140. That is, the electric motor system 100 is operated with the refrigerant reservoir Re filled in the housing 140 such that the liquid surface has a height of RL. As the refrigerant, oil that also serves as lubrication is usually used. The electric motor system 100 has a refrigerant flow path for circulating the refrigerant from the refrigerant reservoir Re toward the electric motor 110. Although the refrigerant flow path may be configured to pass through the outside of the housing 140, the term "filled" is used in the sense that the refrigerant is sealed against leakage to the outside of the housing 140. This refrigerant flow path will be described later in detail.

Figure 2:
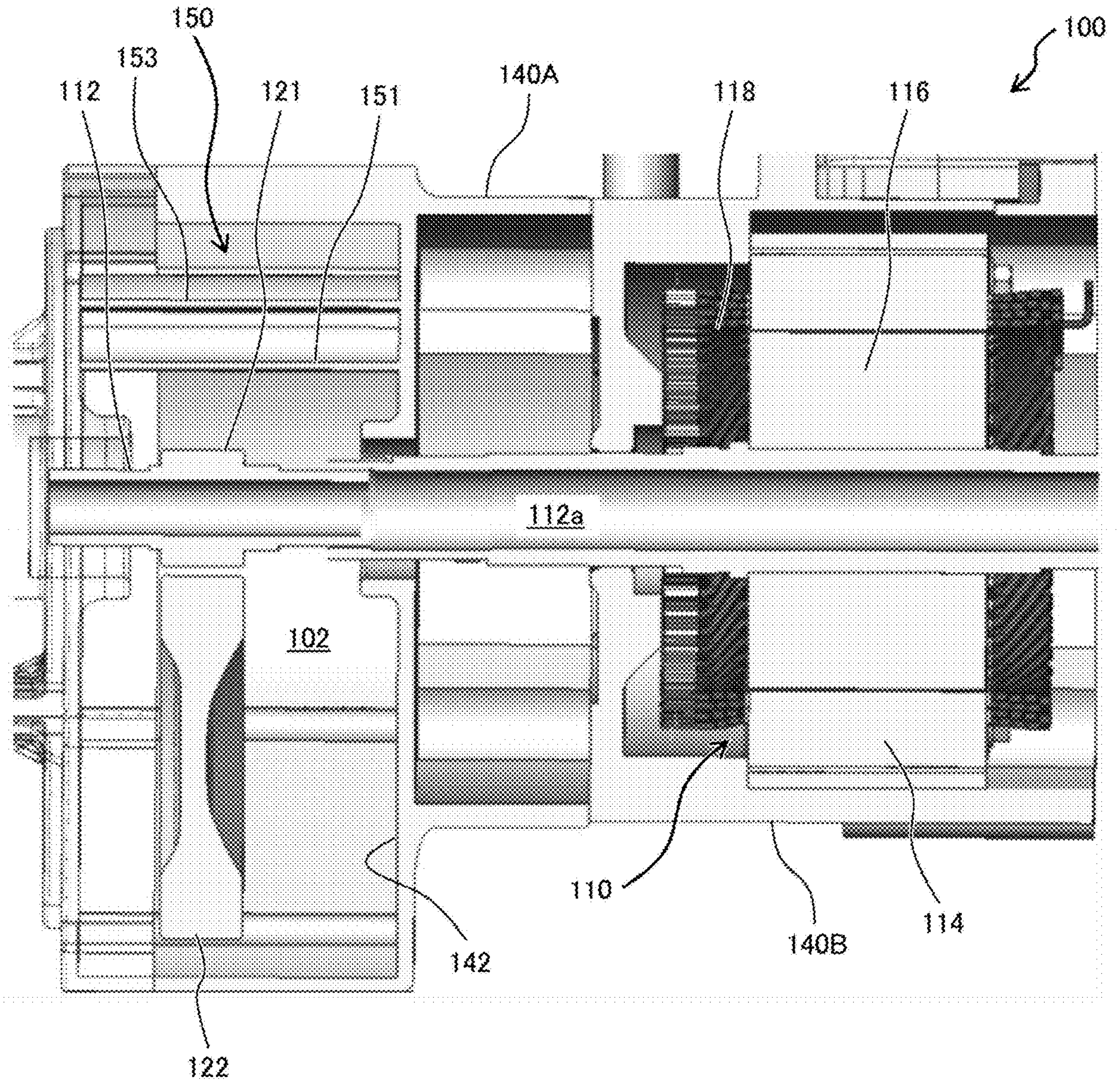
FIG. 2 is a cross-sectional view of the electric motor system illustrating a II-II cross section of FIG. 1.

This will be described with reference to FIG. 2 together with FIG. 1. FIG. 2 is a cross-sectional view of the electric motor system illustrating a II-II cross section of FIG. 1.

As illustrated in FIG. 2, in the electric motor system 100, the gear chamber 102 is partitioned from the electric motor 110 side by a partition wall 142, and the speed reduction device 120 and the differential device 130 are disposed in the gear chamber 102. The housing 140 of the present embodiment is configured by two housing members 140A and 140B, and the gear chamber 102 is configured on the first housing member 140A side. The electric motor 110 is disposed on the second housing member 140B side. The housing member 140 does not need to be configured by two members, and may be configured by one member or may be configured by three or more members. The partition wall 142 is formed integrally with the first housing member 140A.

As illustrated in FIG. 1, the speed reduction device 120 includes a first gear 121, a second gear 122, and a third gear 123. The first gear 121 is provided on an output shaft 112 that outputs rotation of the electric motor 110, and is rotationally driven integrally with the output shaft 112. That is, the shaft of the first gear 121 is configured by the output shaft 112. The second gear 122 and the third gear 123 are provided on a shaft 124, and the second gear 122, the third gear 123, and the shaft 124 integrally rotate about the axial center of the shaft 124. The second gear 122 has a larger diameter than the third gear 123, meshes with the first gear 121, and is driven by the first gear 121. The third gear 123 has a smaller diameter than the second gear 122, is disposed on the partition wall 142 side with respect to the second gear 122, and meshes with the fourth gear 134 constituting the differential device 130 to drive the fourth gear 134.

As described above, the rotation of the electric motor 110 is transmitted to the fourth gear 134 constituting the differential device 130 via the first gear 121, the second gear 122, and the third gear 123 constituting the speed reduction device 120. At that time, the rotational speed is reduced and the torque is increased according to the reduction ratio of the first gear 121, the second gear 122, and the third gear 123. Note that the configuration of the speed reduction device 120 is not limited to the above-described configuration, and for example, the number, arrangement, and the like of gears may be different.

The differential device 130 is a device that transmits the rotational output of the electric motor 110 to the wheels, and includes a fourth gear 134 driven by the speed reduction device 120. The fourth gear 134 is provided on the differential shaft 132 and rotates about the axial center of the differential shaft 132. In the present embodiment, the fourth gear 134 is a ring gear.

The electric motor 110 includes an output shaft 112, a stator core 114, a rotor core 116, and a coil 118. The output shaft 112 and the rotor core 116 constitute a rotor. The stator core 114 and the coil 118 constitute a stator. The output shaft 112 may include one member or a plurality of members. The output shaft 112 has a hollow portion 112*a* extending in the axial direction at the center in the radial direction.

The output shaft 112 of the electric motor 110, the shaft 124 of the second gear 122 and the third gear 123, and the differential shaft 132 of the differential device 130 are arranged in parallel.

Figure 3:
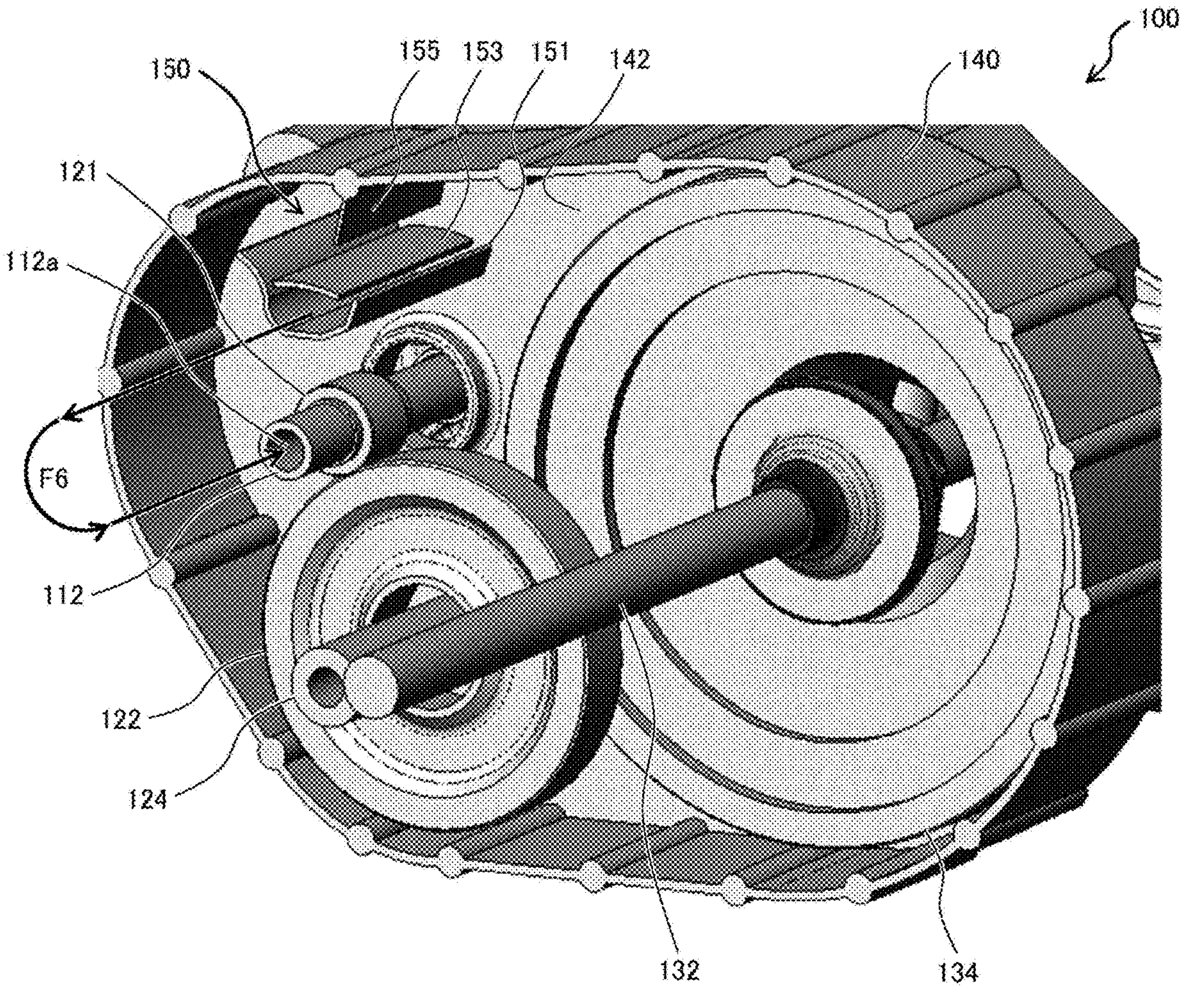
FIG. 3 is a perspective view of the housing portion (gear housing space) of the speed reduction device and the differential device of the electric motor system illustrated in FIG. 1 as viewed from an oblique direction.
Figure 4:
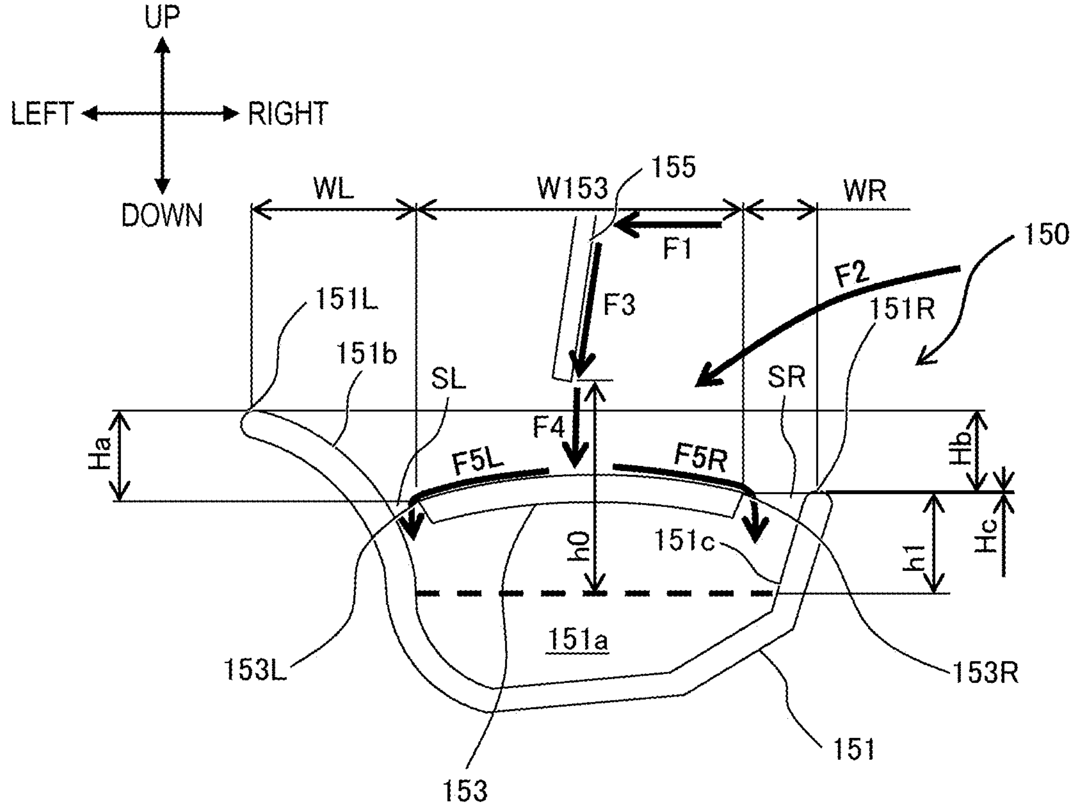
FIG. 4 is a plan view of a refrigerant relay portion applied to the electric motor system according to the embodiment of the present invention as viewed from an axial direction of the electric motor.

Next, a refrigerant relay portion 150 will be described with reference to FIGS. 3 and 4 together with FIG. 1. FIG. 3 is a perspective view of the housing portion (gear housing space) 102 of the speed reduction device 120 and the differential device 130 of the electric motor system 100 illustrated in FIG. 1 as viewed from an oblique direction. FIG. 4 is a plan view of the refrigerant relay portion 150 applied to the electric motor system according to the embodiment of the present invention as viewed from the axial direction of the electric motor 110.

As illustrated in FIG. 1, the fourth gear 134 of the differential device 130 is configured to be partially immersed in the refrigerant reservoir Re. The refrigerant in the refrigerant reservoir Re flies as indicated by arrows F1 and F2 by the rotation of the fourth gear 134 and is received by the refrigerant relay portion (oil relay portion) 150. The refrigerant relay portion 150 is provided in the middle of a refrigerant flow path through which the refrigerant flows from the refrigerant reservoir Re to the electric motor 110, and constitutes a refrigerant storage portion that stores the refrigerant. When the refrigerant reservoir Re is a first refrigerant storage portion, the refrigerant relay portion 150 is a second refrigerant storage portion.

As illustrated in FIG. 3, a refrigerant F6 stored in the refrigerant relay portion 150 flows toward the electric motor 110 through the hollow portion 112*a* of the output shaft 112 of the electric motor 110.

As illustrated in FIGS. 3 and 4, the refrigerant relay portion 150 includes a first surface 155, a second surface 153, and a recess 151.

The first surface 155 is constituted by a surface of a member (portion) constituting the first surface 155 facing the fourth gear 134. In the horizontal direction (left-right direction) perpendicular to the vertical direction and perpendicular to the axial center of the fourth gear 134, the first surface 155 is inclined such that a side closer to the fourth gear 134 is located upward in the vertical direction and a side farther from the fourth gear 134 is located downward in the vertical direction.

The first surface 155 is scraped up as the fourth gear 134 rotates and receives a flying refrigerant (oil) as indicated by the arrow F1 in FIG. 1. The first surface 155 constitutes a guide surface (guide portion) that guides received refrigerant F3 to the second surface 153.

The second surface 153 is constituted by an upper surface of a member (portion) constituting the second surface 153. The second surface 153 is located downward in the vertical direction with respect to the first surface 155, and faces the first surface 155 at a position overlapping the first surface 155 in the vertical direction. As a result, a refrigerant F4 dropped from the first surface 155 is received. The second surface 153 receives a refrigerant (oil) that is scraped up as the fourth gear 134 rotates and flies as indicated by the arrow F2 in FIG. 1.

Here, since the second surface 153 faces the first surface 155 at a position overlapping the first surface 155 in the vertical direction, the second surface 153 faces the first surface 155 at a position (range) overlapping the first surface 155 in the left-right direction. The second surface 153 is disposed away from the lower end of the first surface 155.

The second surface 153 is provided so as to cover a part of the opening of the recess 151. That is, both ends 153L and 153R of the second surface 153 in the left-right direction are located inside both ends 151L and 151R of the recess 151 in the left-right direction. Specifically, the left end 153L of the second surface 153 is inside the left end 151L of the recess 151 by WL, and the right end 153R of the second surface 153 is inside the right end 151R of the recess 151 by WR. In this case, WL of the recess 151 is larger than WR.

The second surface 153 constitutes a cover member that covers the central portion of the opening of the recess 151 in the left-right direction. The both ends 153L and 153R of the second surface 153 in the left-right direction are located below the both ends 151L and 151R of the recess 151 in the left-right direction in the vertical direction. At the both ends 153L and 153R of the second surface 153 in the left-right direction, flow paths SL and SR communicating with the inside of the recess 155 (refrigerant reservoir 151*a*) are formed. As a result, refrigerants F5L and F5R received by the second surface 153 can be reliably guided to the refrigerant reservoir 151*a* inside the recess 151.

In FIG. 4, the width of the flow path SR in the left-right direction is made larger than the width of the flow path SL. However, by making the width of the flow path SR smaller than the width of the flow path SL, the refrigerant F2 directly jumping into the refrigerant reservoir 151*a* of the recess 151 can be reduced without colliding with the first surface 155.

In the present embodiment, the second surface 153 includes a curved surface in which a portion between the both ends 153L and 153R protrudes upward in the vertical direction with respect to the both ends 153L and 153R in the left-right direction. As a result, the distance between the second surface 153 and the lower end of the first surface 155 can be shortened, and the refrigerant dropped from the first surface 155 to the second surface 153 can be prevented from being entrained with air. In addition, since the second surface 153 is constituted by the inclined surface descending toward the both ends 153L and 153R, the refrigerants F5L and F5R can be smoothly guided to the flow paths SL and SR, and excessive accumulation of the refrigerants F5L and F5R on the second surface 153 can be suppressed.

The recess 151 is located downward in the vertical direction with respect to the second surface 153, and the refrigerant received by the second surface 153 flows into the recess 151. The recess 151 has a function of temporarily storing the flowed refrigerant, and serves as a main part of the second refrigerant storage portion.

An upper end of a side wall 151*b* of the recess 151, which is located forward in the flight direction of the refrigerant F2, is located higher than the left end 153L of the second surface 153 by Ha, and an upper end of a side wall 151*c* on the opposite side of the recess 151 is located higher than the right end 153R of the second surface 153 by Hc. The upper end of the left side wall 151*b* is located higher than the upper end of the right side wall 151*c* by Hb.

The left end 151L of the recess 151 is outside the left end 153L of the second surface 153 by WL, and the right end 151R of the recess 151 is outside the right end 153R of the second surface 153 by WR. In this case, the left side wall 151*b* of the recess 151 forms a large inclined surface, and the upper end thereof is located higher by Hb than the upper end of the right side wall 151*c*, so that WL of the recess 151 is larger than WR.

When the second surface 153 is not provided, a distance ho between the lower end of the first surface 155 and the liquid surface of the refrigerant reservoir 151*a* increases, and the drop speed of the refrigerant F4 dropped from the lower end of the first surface 155 onto the liquid surface of the refrigerant reservoir 151*a* increases. The refrigerant F4 having the increased drop velocity entrains air when dropping onto the liquid surface of the refrigerant reservoir 151*a*, and air bubbles are mixed in the refrigerant. The refrigerant F2 collides with the liquid surface of the refrigerant reservoir 151*a* at a high flight speed to entrain air, and air bubbles are mixed in the refrigerant. When air bubbles are mixed in the refrigerant, bubbles (air) in the refrigerant inhibit heat transfer, and cooling performance of the refrigerant is deteriorated.

In the present embodiment, since the second surface 153 is provided, the refrigerant F4 dropped from the lower end of the first surface 155 is received by the second surface 153, so that the dropping speed of the refrigerants F5L and F5R dropping on the liquid surface of the refrigerant reservoir 151*a* can be reduced. By being received by the second surface 153, the refrigerant F2 can be prevented from colliding with the liquid surface of the refrigerant reservoir

151*a* at a high flight speed. In the present embodiment, by introducing the flows F3 and F4 of the refrigerant passing through the first surface 155 and the flow F2 of the refrigerant not passing through the first surface 155 into the refrigerant reservoir 151*a*, it is possible to secure the flow amount of the refrigerant introduced into the refrigerant reservoir 151*a*, reduce air bubbles mixed in the refrigerant in the refrigerant reservoir 151*a*, and suppress deterioration in cooling performance of the refrigerant.

In the present embodiment, while the refrigerant moves on the second surface 153, the flow velocity decreases and the refrigerant accumulates on the second surface 153, so that an effect of reducing air bubbles (breaking bubbles) generated in the refrigerant can be obtained.

When the vehicle moves backward or the like, the fourth gear 134 rotates in the reverse direction, and the amount of refrigerant flowing from the fourth gear 134 to the refrigerant relay portion 150 becomes insufficient. In this case, the supply amount of the refrigerant to the refrigerant relay portion 150 may be increased by increasing the discharge amount from an oil pump (not illustrated).

Figure 5:
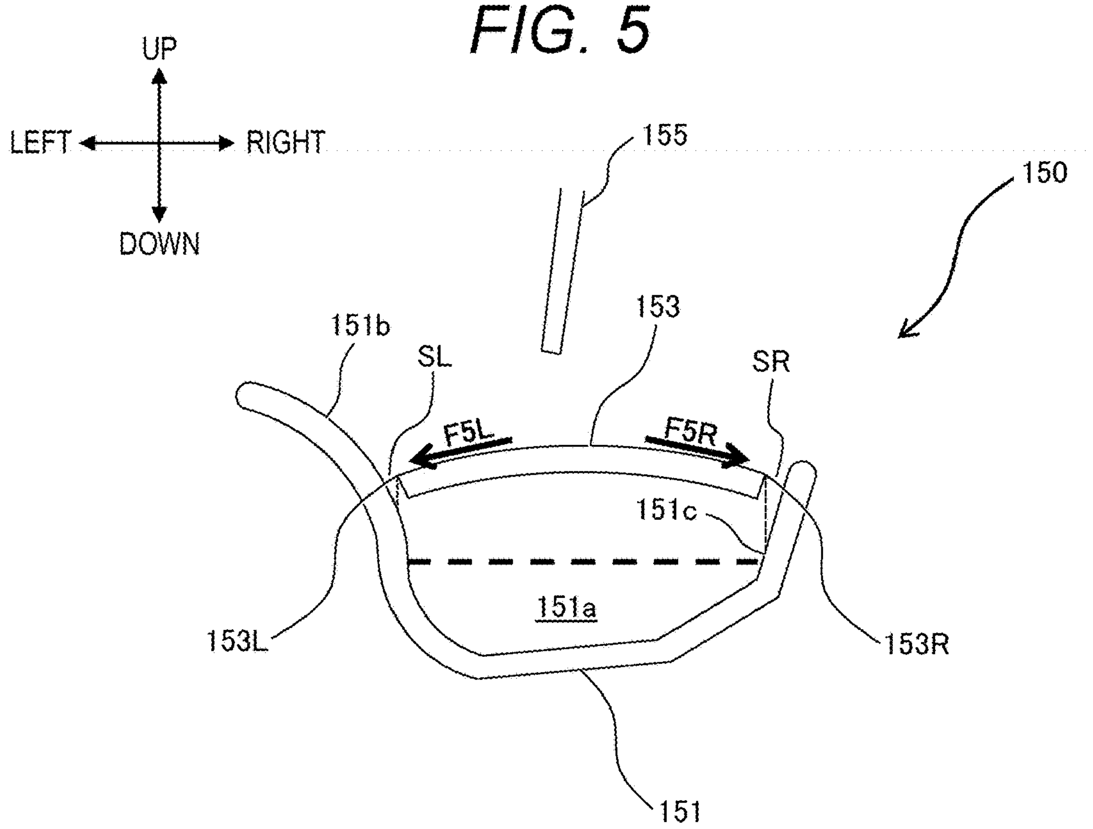
FIG. 5 is a view illustrating a modification of the refrigerant relay portion, and is a plan view of the refrigerant relay portion as viewed from the axial direction of the electric motor.

Next, a modification example of the refrigerant relay portion 150 will be described with reference to FIG. 5. FIG. 5 is a view illustrating a modification of the refrigerant relay portion 150, and is a plan view of the refrigerant relay portion 150 as viewed from the axial direction of the electric motor 110.

In the present example, the left end 153L of the second surface 153 is disposed at a position overlapping the left side wall 151*b* of the recess 151 forming an inclined surface inclined with respect to the vertical direction in the left-right direction, and the right end 153R of the second surface 153 is disposed at a position overlapping the right side wall 151*c* of the recess 151 forming an inclined surface inclined with respect to the vertical direction in the left-right direction. That is, the recess 151 is configured by an inclined surface in which the portions (side walls) 151*b* and 151*c* that receive the oil flowing in from the second surface 153 are inclined with respect to the vertical direction.

As a result, the refrigerant dropped from the second surface 153 flows down to the inclined surfaces of the side walls 151*b* and 151*c*, so that generation of air bubbles can be suppressed.

The other configurations can be configured in the same manner as in the above-described embodiment, and the same functions and effects as in the above-described embodiment can be obtained.

Figure 6:
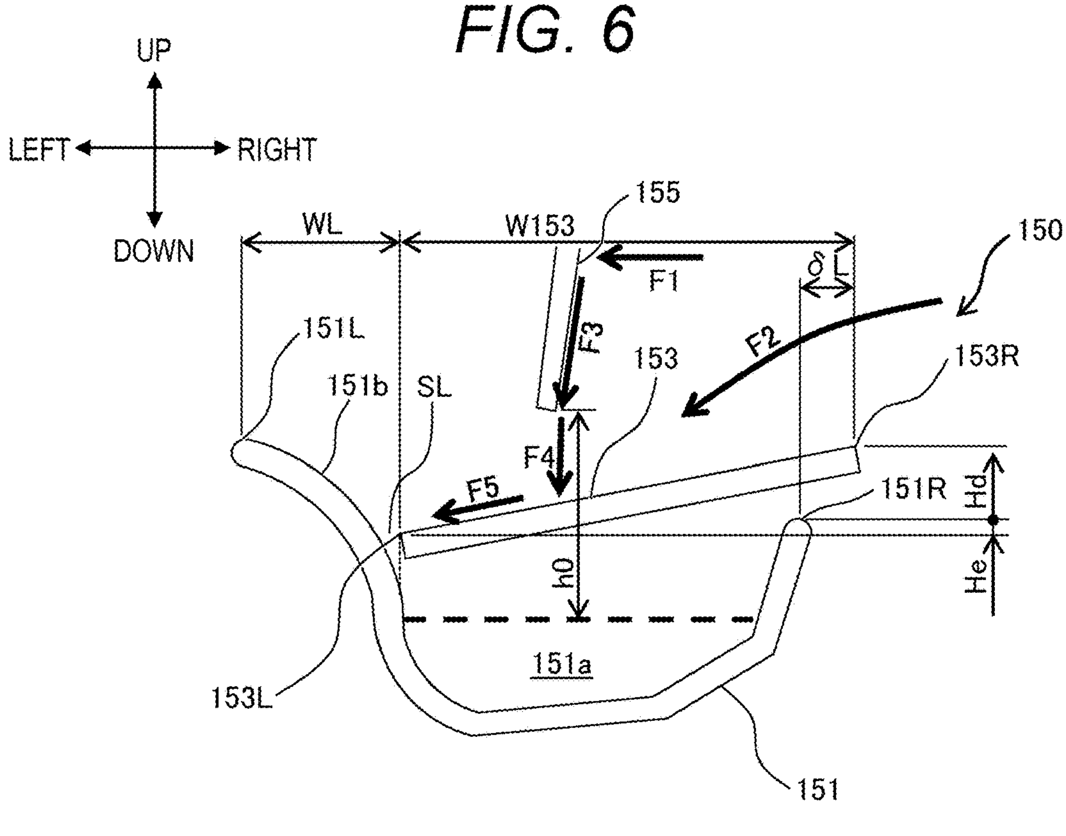
FIG. 6 is a view illustrating a modification of the refrigerant relay portion, and is a plan view of the refrigerant relay portion as viewed from the axial direction of the electric motor.

Next, a modification example of the refrigerant relay portion 150 will be described with reference to FIG. 6. FIG. 6 is a view illustrating a modification of the refrigerant relay portion 150, and is a plan view of the refrigerant relay portion 150 as viewed from the axial direction of the electric motor 110.

The refrigerant relay portion 150 of the present example is different from that of the above-described embodiment in the configuration of the second surface 153. In the present example, the second surface 153 is inclined so as to be located upward in the vertical direction with respect to the end 153L in which the end 153R closer (right side) to the fourth gear 134 is farther (left side) in the left-right direction. That is, the second surface 153 is constituted by an inclined surface inclined in one direction. The flow path SL communicating with the inside of the recess 151 is formed on the side (left side) of the end 153L farther from the fourth gear 134, and the refrigerant collected on the second surface 153 flows into the recess 151 through the flow path SL.

In the present example, the flow path communicating with the inside of the recess 151 is only the left flow path SL, and the right flow path SR is not provided. Therefore, it is possible to reduce the refrigerant directly jumping into the recess 151 without passing through the second surface 153, and it is possible to suppress mixture of air (air bubbles) into the refrigerant in the refrigerant reservoir 151*a*.

The other configurations can be configured in the same manner as in the above-described embodiment, and the same functions and effects as in the above-described embodiment can be obtained.

The present invention is not limited to each embodiment described above, but includes various modifications. For example, the embodiment described above has been described in detail for easy understanding of the present invention, and the present invention is not necessarily limited to those having all the configurations. In addition, it is possible to add, delete, and replace other configurations for a part of the configuration of each embodiment.

REFERENCE SIGNS LIST

134 fourth gear
150 refrigerant relay portion
151 recess
151*b*, 151*c* portion (side wall) of recess 151 that receives oil flowing in from second surface 153
151L, 151R both ends of recess 151 in left-right direction
153 second surface
153L, 153R both ends of second surface 153 in left-right direction
155 first surface
F1 to F5L, F5R refrigerant (oil)
SL flow path formed on side (left side) of end 153L farther from fourth gear 134

The invention claimed is:

1. An electric motor system comprising:

a gear;

a first surface that receives oil scraped off as the gear rotates;

a second surface that is located downward in a vertical direction with respect to the first surface, faces the first surface at a position overlapping the first surface in the vertical direction, receives the oil dropped from the first surface, and receives the oil scraped up as the gear rotates; and a recess located downward in the vertical direction with respect to the second surface and into which the oil received by the second surface flows, wherein both ends of the second surface in a horizontal direction perpendicular to the vertical direction and perpendicular to an axial center of the gear are located inside both ends of the recess in the horizontal direction.

2. The electric motor system according to claim 1, wherein the second surface includes a curved surface in which a portion between the both ends of the second surface in the horizontal direction protrudes upward in the vertical direction with respect to the both ends.

3. The electric motor system according to claim 2, wherein the both ends of the second surface in the horizontal direction are located downward with respect to the both ends of the recess in the horizontal direction in the vertical direction.

4. The electric motor system according to claim 3, wherein a flow path communicating with an inside of the recess is formed at the both ends of the second surface in the horizontal direction.

5. The electric motor system according to claim 4, wherein the recess includes an inclined surface in which a portion that receives the oil flowing in from the second surface is inclined with respect to the vertical direction.

6. The electric motor system according to claim 1, wherein the first surface is inclined such that a side closer to the gear in the horizontal direction is located upward in the vertical direction, and a side farther from the gear is located downward in the vertical direction.

7. An electric motor system comprising:

a gear;

a first surface that receives oil scraped off as the gear rotates;

a second surface that is located downward in a vertical direction with respect to the first surface, faces the first surface at a position overlapping the first surface in the vertical direction, receives the oil dropped from the first surface, and receives the oil scraped up as the gear rotates; and a recess located downward in the vertical direction with respect to the second surface and into which the oil collected on the second surface flows, wherein the first surface is inclined such that a side closer to the gear is located upward in the vertical direction and a side farther from the gear is located downward in the vertical direction in a horizontal direction perpendicular to the vertical direction and perpendicular to an axial center of the gear, the second surface is inclined such that an end closer to the gear is located upward in the vertical direction with respect to an end farther from the gear in the horizontal direction, and a flow path communicating with an inside of the recess is formed on a side of the end farther from the gear.

* * * * *